(12) United States Patent
Liu et al.

(10) Patent No.: US 8,980,035 B2
(45) Date of Patent: *Mar. 17, 2015

(54) METHOD FOR MAKING CARBON NANOTUBE FILM STRUCTURES

(75) Inventors: Liang Liu, Beijing (CN); Li Qian, Beijing (CN); Yu-Quan Wang, Beijing (CN); Chen Feng, Beijing (CN)

(73) Assignee: Beijing FUNATE Innovation Technology Co., Ltd., Beijing (CN)

( * ) Notice: Subject to any disclaimer, the term of this patent is extended or adjusted under 35 U.S.C. 154(b) by 181 days.

This patent is subject to a terminal disclaimer.

(21) Appl. No.: 13/464,349

(22) Filed: May 4, 2012

(65) Prior Publication Data

US 2013/0146215 A1 Jun. 13, 2013

(30) Foreign Application Priority Data

Dec. 9, 2011 (CN) .......................... 2011 1 0408585

(51) Int. Cl.
*B82Y 40/00* (2011.01)

(52) U.S. Cl.
USPC ........................... 156/193; 156/184; 156/250

(58) Field of Classification Search
USPC .................................. 156/193, 184, 250, 60
See application file for complete search history.

(56) References Cited

U.S. PATENT DOCUMENTS

| | | | |
|---|---|---|---|
| 7,744,793 B2 * | 6/2010 | Lemaire et al. | 264/172.19 |
| 8,048,256 B2 | 11/2011 | Feng et al. | |
| 2009/0096348 A1 | 4/2009 | Liu et al. | |
| 2009/0321421 A1 | 12/2009 | Feng et al. | |
| 2010/0308489 A1 | 12/2010 | Feng et al. | |
| 2011/0052478 A1 | 3/2011 | Feng et al. | |
| 2011/0155295 A1 * | 6/2011 | Fan et al. | 156/60 |
| 2011/0155312 A1 | 6/2011 | Feng et al. | |

FOREIGN PATENT DOCUMENTS

| | | |
|---|---|---|
| CN | 101616515 | 12/2009 |
| CN | 102115071 | 7/2011 |
| TW | 200920168 | 5/2009 |
| TW | 201043569 | 12/2010 |
| TW | 201109275 | 3/2011 |
| TW | 201127749 | 8/2011 |
| TW | 201134752 | 10/2011 |

* cited by examiner

*Primary Examiner* — Jeff Aftergut
(74) *Attorney, Agent, or Firm* — Novak Druce Connolly Bove + Quigg LLP

(57) ABSTRACT

A method for making a carbon nanotube film structure is related. A rotator having an axis and a rotating surface is provided. A carbon nanotube film drawn from a carbon nanotube array is adhered on the rotating surface of the rotator. The rotator is rotated about the axis to wrap the carbon nanotube film on the rotating surface of the rotator to form a carbon nanotube layer. The carbon nanotube layer is cut along a direction to form the carbon nanotube film structure.

18 Claims, 2 Drawing Sheets

METHOD FOR MAKING CARBON NANOTUBE FILM STRUCTURES

RELATED APPLICATIONS

This application claims all benefits accruing under 36 U.S.C. §119 from China Patent Application No. 201110408585.7, filed on Dec. 9, 2011 in the China Intellectual Property Office, the disclosure of which is incorporated herein by reference. This application is related to application Ser. No. 13/464,342 entitled, "METHOD FOR MAKING HEATERS", filed May 4, 2012.

BACKGROUND

1. Technical Field

The present disclosure relates to a method for carbon nanotube film structures.

2. Discussion of Related Art

Carbon nanotubes prepared by conventional methods are in particle or powder forms, which limits the applications of carbon nanotube. Thus, preparation of macro-scale carbon nanotube structures, such as carbon nanotube film structure, has attracted a great deal of attention. A typical carbon nanotube film structure can be formed by stacking a plurality of carbon nanotube films drawn from a carbon nanotube array. However, a time period for making the carbon nanotube film structure can be long, and the process is complex.

Therefore, a method for making a carbon nanotube film structure is provided, to overcome the above-described shortcomings.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings. It should be noted that references to "an" or "one" embodiment in this disclosure are not necessarily to the same embodiment, and such references mean at least one.

Figure 1:
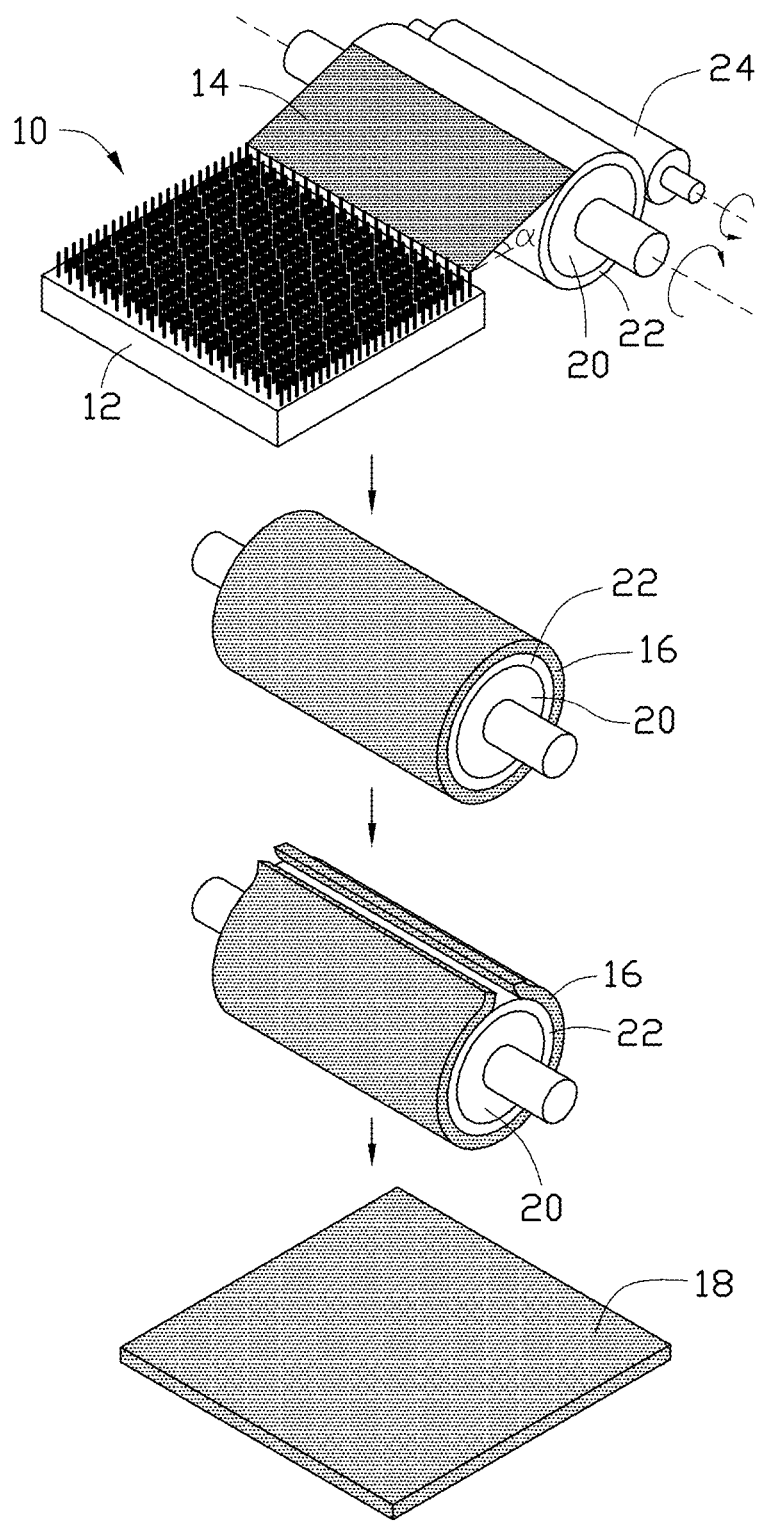
FIG. 1 shows a flowchart of one embodiment of a method for making a carbon nanotube film structure.

Referring to FIG. 1, a method for making a carbon nanotube film structure 18 of one embodiment can include the following steps:

(S10) providing a rotator 20 having a first axis, wherein the rotator 20 can rotate about the first axis and includes a rotating surface capable of rotating about the first axis;

(S11) drawing a carbon nanotube film 14 from a carbon nanotube array 12 and adhering an end of the carbon nanotube film 14 on the rotating surface of the rotator 20;

(S12) rotating the rotator 20 about the first axis and wrapping the carbon nanotube film 14 about the rotating surface of the rotator 20 for at least one circle to form a carbon nanotube layer 16; and (S13) cutting the carbon nanotube layer 16 to form the carbon nanotube film structure 18.

In step (S10), the rotator 20 can be a cylinder, a plate, a triangular column and a multi-angular column. In one embodiment, the rotator 20 is a cylinder. The rotator 20 can be fixed to an electrical motor (not shown) and can be rotated by the electrical motor about the first axis under a certain rotating speed.

The rotator 20 can further include a coating layer 22 coated on the rotating surface of the rotator 20. A material of the coating layer 22 can have weak attachment with carbon nanotubes. The material of the coating layer 22 can be fluoropolymers, metals, metal oxides, ceramics or rubbers. The material of the coating layer 22 can be polytetrafluoroethylene (PTFE), perfluoroalkoxy polymer (PFA), polyvinylidene fluoride (PVDF), polyvinylfluoride (PVF), fluorinated ethylene-propylene (FEP), polyethylenetetrafluoroethylene (ETFE), polyethylenechlorotrifluoroethylene (ECTFE), copper, silver or gold. The coating layer 22 can include a plurality of micropores distributed uniformly on an outer surface of the coating layer 22, away from the rotator 20. A diameter of the plurality of micropores can be in a range from about 1 micrometer to about 1000 micrometers. A distance between adjacent micropores can be in a range from about 1 micrometer to about 1000 micrometers. A depth of the micropores can be in a range from about 1 micrometer to about 1000 micrometers. In some embodiments, the plurality of micropores is distributed unevenly in the outer surface of the coating layer 22.

In some embodiments, the size and the distribution conditions of the plurality of micropores can be changed, to make sure that the ratio of the diameter of the plurality of micropores and a distance between adjacent micropores is greater than or equal to 5:1, and the distance between adjacent micropores is less than or equal to about 100 micrometers, so that a void ratio of the outer surface of the coating layer 22 can be greater than or equal to 80%. A material of the coating layer 22 can be metal, metal oxide, ceramics, rubber, or fluoropolymers. In one embodiment, the coating layer 22 is an anodic aluminum oxide film. The anodic aluminum oxide film can be made by an anode oxidation method. The anodic aluminum oxide film defines a plurality of the micropores distributed uniformly on the outer surface. A diameter of the plurality of micropores on the outer surface of anodic aluminum oxide film is about 500 micrometers. A distance between adjacent micropores is about 50 micrometers.

In step (S11), a method for drawing the carbon nanotube film 14 from the carbon nanotube array 12 includes: (S111) providing a carbon nanotube array 12 capable of having a film drawn therefrom; and (S112) pulling/drawing out a carbon nanotube film 14 from the carbon nanotube array 12. The pulling/drawing can be done by using a tool (e.g., adhesive tape, pliers, tweezers, or other tools that allow multiple carbon nanotubes to be gripped and pulled simultaneously).

In step (S111), the carbon nanotube array 12 can be formed by a chemical vapor deposition (CVD) method. The carbon nanotube array 12 includes a plurality of carbon nanotubes substantially parallel to each other and substantially perpendicular to the substrate 13. The carbon nanotubes in the carbon nanotube array 12 are closely packed together by van der Waals force. The carbon nanotubes in the carbon nanotube array 12 can be single-walled carbon nanotubes, double-walled carbon nanotubes, multi-walled carbon nanotubes, or combinations thereof. The diameter of the carbon nanotubes can be in the range from about 0.5 nanometers to about 50 nanometers. The height of the carbon nanotubes can be in the range from about 50 nanometers to 5 millimeters. In one embodiment, the height of the carbon nanotubes can be in a range from about 100 microns to 900 microns.

In step (S112), the carbon nanotube film 14 includes a plurality of carbon nanotubes, and there are interspaces between adjacent two carbon nanotubes. Carbon nanotubes in the carbon nanotube film 14 can be substantially parallel to a surface of the carbon nanotube film 14. A distance between adjacent two carbon nanotubes can be larger than a diameter of the carbon nanotubes. The carbon nanotube film 14 can be pulled/drawn by the following sub-steps: (S1121) selecting a carbon nanotube segment having a predetermined width from the carbon nanotube array 12; and (S1122) pulling the carbon nanotube segment at an even/uniform speed to achieve a uniform drawn carbon nanotube film 14.

In step (S1121), the carbon nanotube segment having a predetermined width can be selected by using a tool to contact the carbon nanotube array 12, such as an adhesive tape. The carbon nanotube segment includes a plurality of carbon nanotubes parallel to each other. In step (S1122), the pulling direction is substantially perpendicular to a growing direction of the carbon nanotube array 12.

Figure 2:
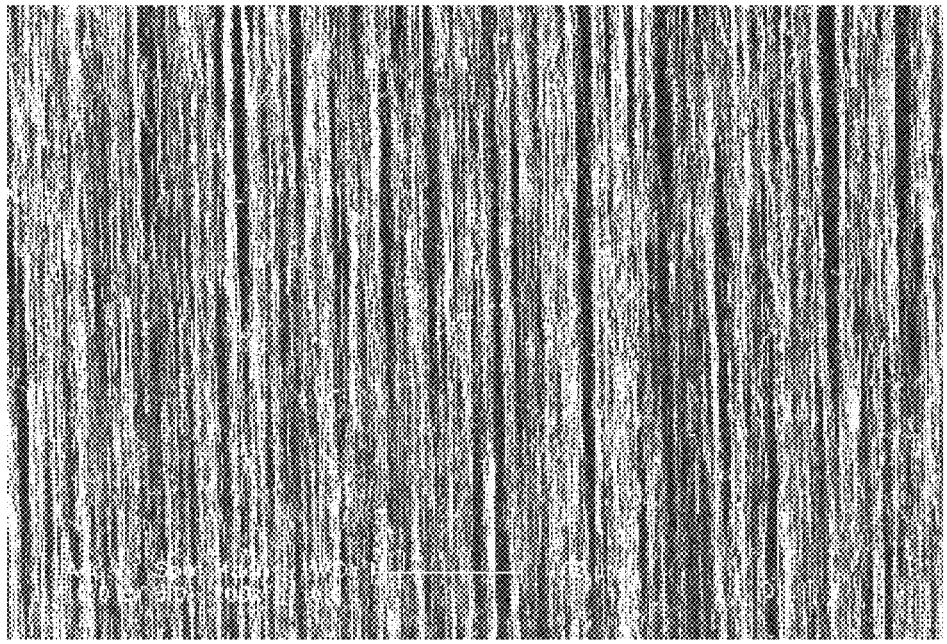
FIG. 2 shows a scanning electron microscope (SEM) image of one embodiment of a carbon nanotube film.

Specifically, during the pulling process, as the initial carbon nanotube segment is drawn out, other carbon nanotube segments are also drawn out end-to-end due to the van der Waals force between the ends of the adjacent segments. This process of drawing ensures that a continuous, uniform carbon nanotube film 14 having a predetermined width can be formed. Referring to FIG. 2, the carbon nanotube film 14 includes a plurality of carbon nanotubes joined end-to-end. The carbon nanotubes in the carbon nanotube film 14 are parallel to the pulling/drawing direction of the drawn carbon nanotube film 14. A large number of the carbon nanotubes in the carbon nanotube film 14 can be oriented along a preferred orientation, meaning that a large number of the carbon nanotubes in the carbon nanotube film 14 are arranged substantially along the same direction. An end of one carbon nanotube is joined to another end of an adjacent carbon nanotube arranged substantially along the same direction, by van der Waals force, to form a free-standing film. By 'free-standing', it is meant that the carbon nanotube structure does not have to be supported by a substrate and can sustain its own weight when it is hoisted by a portion thereof without tearing. In the carbon nanotube film 14, the adjacent two carbon nanotubes side by side may be in contact with each other or spaced apart from each other. The carbon nanotube film 14 has an extremely large specific surface area and a sticky characteristic.

After the carbon nanotube film 14 is drawn from the carbon nanotube array 12, one end of the carbon nanotube film 14 is adhered on the rotating surface of the rotator 20. The end of the carbon nanotube film 14 can be adhered on the rotating surface of the rotator 20 by an adhesive agent or the stickiness of the carbon nanotube film 14. An angle α can be formed between the surface of the substrate 13 and the carbon nanotube film 14, when the end of the carbon nanotube film 14 is adhered on the rotating surface of the rotator 20. The angle α can be in a range from about 0 degree to about 30 degrees. That is, an angle between an oriented direction of the plurality of carbon nanotubes in the carbon nanotube array 12 and the carbon nanotube film 14 is in a range from about 60 degrees to about 90 degrees. In some embodiments, the angle α is in a range from about 0 degree to about 5 degrees. In one embodiment, the angle α is equal to about 3 degrees. In one embodiment, the rotator 20 includes a coating layer 22 on the rotating surface of the rotator 20, the end of the carbon nanotube film 14 is adhered on the outer surface of the coating layer 22.

Step (S11) can further include an optional step (S113) of treating the rotating surface of the rotator 20 with an organic solvent to reduce a force between the carbon nanotube film 14 and the rotator 20. The organic solvent can also be ethanol, methanol, acetone, dichloroethane, chloroform, or any combination thereof. In one embodiment, step (S113) can include a step of spraying the organic solvent on the rotating surface of the rotator 20.

In step (S12), the carbon nanotube film 14 can be drawing from the carbon nanotube array 12 successively and wrapped on the rotating surface of the rotator 20 to form the carbon nanotube layer 16, because the end of the carbon nanotube film 14 is adhered on the rotating surface of the rotator 20. During the rotating process, a tension along the surface of the carbon nanotube film 14 can be provided by the rotator 20 to draw the carbon nanotube film 14 from the carbon nanotube array 12 successively. If the rotator 20 includes a coating layer 22 on the rotating surface of the rotator 20, the carbon nanotube film 14 is wrapped on the outer surface of the coating layer 22 to form the carbon nanotube layer 16.

A linear speed of the rotator 20 can be in a range from about 0.01 m/s to about 15 m/s. In one embodiment, the linear speed of the rotator 20 is about 5 m/s.

A thickness of the carbon nanotube layer 16 can be controlled by a number of cycles of the carbon nanotube film 14 wrapped on the rotating surface of the rotator 20. In one embodiment, the carbon nanotube layer 16 includes 1000 layers of carbon nanotube film 14 stacked together. Furthermore, because the carbon nanotube film 14 has the stickiness characteristic, adjacent carbon nanotube films 14 in the carbon nanotube layer 16 can be adhere to each other firmly.

A roller 24 can be further provided beside the rotator 20. The roller 24 can have a second axis, and the second axis of the roller 24 can be substantially parallel to the first axis of the rotator 20. A linear contact can be formed between the roller 24 and the rotator 20. The roller 24 can be used to press the carbon nanotube layer 16 and make the carbon nanotube films 14 in the carbon nanotube layer 16 to adhere to each other more firmly during the rotating process. A length of the roller 24 is not limited. A material of the roller 24 can be metal, metal oxide, ceramics, porous material or rubber. In one embodiment, the material of the roller 24 is rubber.

During the rotating process, an optional step (S121) of treating the roller 24 with an organic solvent can be further provided. The organic solvent can be sprayed on the outer surface of the roller 24 to reduce a force between the roller 24 and the carbon nanotube layer 16. Therefore, the carbon nanotubes in the carbon nanotube layer 16 cannot be adhered on the outer surface of the roller 24. The organic solvent can be volatile at room temperature and can be ethanol, methanol, acetone, dichloroethane, chloroform, or any combination thereof. In one embodiment, the organic solvent is ethanol.

In step (S13), the carbon nanotube layer 16 can be cut by mechanical cutting method or laser ablating method to form the carbon nanotube film structure 18.

The mechanical cutting method includes the steps of: providing a cutter; and cutting the carbon nanotube layer 16 along a first direction.

The laser ablating method includes the steps of: providing a laser device; irradiating the carbon nanotube layer 16 by the laser device along the first direction to ablate the carbon nanotube layer 16. In some embodiments, the first direction is parallel to the first axis of rotator 20.

After the carbon nanotube layer 16 is cut along the first direction, the carbon nanotube layer 16 can be peeled off from the rotating surface of the rotator 20 to form the carbon nanotube film structure 18. It is to be noted that, because the coating layer 22 with the plurality of micropores is fixed between the carbon nanotube layer 16 and the rotator 20, an effective contact area between carbon nanotube layer 16 and the coating layer 22 can be reduced, thus the carbon nanotube layer 16 can be peeled off from the coating layer 22 easily without damage. The carbon nanotubes in the carbon nanotube film structure 18 are oriented along a preferred orientation and joined end-to-end by van der Waals attractive force therebetween.

After step (S13), an optional step (S14) of treating the carbon nanotube film structure 18 with an organic solvent can be further included. The optional step (S14) can make the carbon nanotube films 14 in the carbon nanotube film structure 18 combine with each other more tightly. The contact surface between the adjacent carbon nanotube films 14 can be increased if the carbon nanotube film structure 18 is treated by the organic solvent. Thus, the carbon nanotube films 14 can be adhered each other more firmly. The organic solvent can also be ethanol, methanol, acetone, dichloroethane, chloroform, or any combination thereof. The organic solvent should have a desirable wettability to the carbon nanotubes. In the embodiment, step (S14) can include a step of applying the organic solvent on a surface of the carbon nanotube film structure 18 by dropping the organic solvent from a dropper; or immersing the entire carbon nanotube film structure 18 into an organic solvent filled in a container.

The method for making the carbon nanotube film structure has at least the following advantages. First, it is convenient to make a carbon nanotube film structure by drawing a carbon nanotube film from a carbon nanotube array and then wrapping the carbon nanotube film on the rotator. Second, if the carbon nanotube layer is wrapped on the outer surface of the coating layer, the carbon nanotube layer can be easily peeled off from the coating layer without damage.

The above-described embodiments are intended to illustrate rather than limit the disclosure. Variations may be made to the embodiments without departing from the spirit of the disclosure as claimed. The above-described embodiments illustrate the scope of the disclosure but do not restrict the scope of the disclosure.

Depending on the embodiment, certain of the steps of methods described may be removed, others may be added, and the sequence of steps may be altered. It is also to be understood that the description and the claims drawn to a method may include some indication in reference to certain steps. However, the indication used is only to be viewed for identification purposes and not as a suggestion as to an order for the steps.

What is claimed is:

1. A method for making a carbon nanotube film structure, the method comprising:
   (a) providing a rotator having a first axis and a rotating surface and a roller fixed beside the rotator, wherein the rotator is a cylinder, the rotating surface is capable of rotating about the first axis, the roller has a second axis, the second axis of the roller is parallel to the first axis of the rotator, and a linear contact is formed between the roller and the rotator;
   (b) drawing a carbon nanotube film from a carbon nanotube array and adhering one end of the carbon nanotube film on the rotating surface of the rotator;
   (c) wrapping the carbon nanotube film on the rotating surface of the rotator to form a carbon nanotube layer by rotating the rotator about the first axis; and
   (d) cutting the carbon nanotube layer along a first direction.

2. The method of claim 1, wherein the carbon nanotube array is formed on a surface of a substrate, and an angle between the surface of the substrate and the drawn carbon nanotube film is in a range from about 0 degrees to about 30 degrees.

3. The method of claim 2, wherein the angle between the surface of the substrate and the drawn carbon nanotube film is in a range from about 0 degree to about 5 degree.

4. The method of claim 3, wherein a linear speed of the rotating surface is in a range from about 0.01 m/s to about 15 m/s.

5. The method of claim 1, wherein the carbon nanotube layer is cut along the first direction parallel to the first axis of the rotator.

6. The method of claim 1, wherein the carbon nanotube layer is cut by cutting the carbon nanotube layer with a cutter along the first direction.

7. The method of claim 5, wherein the carbon nanotube layer is cut by a laser ablating method, the laser ablating method comprises sub-steps of:
   providing a laser device; and
   irradiating the carbon nanotube layer by the laser device along the first direction to ablate the carbon nanotube layer.

8. The method of claim 1, wherein further comprising treating the rotating surface of the rotator with an organic solvent.

9. The method of claim 1, wherein the roller comprises a material that is selected from the group consisting of fluoropolymer, metal, metal oxide, ceramics, porous material, and rubber.

10. The method of claim 1, wherein the step (c) further comprises sub-steps of:
    treating the carbon nanotube film structure with an organic solvent to adhere the carbon nanotube film to each other more firmly.

11. The method of claim 10, wherein the organic solvent comprises a material that is selected from the group consisting of ethanol, methanol, acetone, dichloroethane, chloroform, and any combination thereof.

12. The method of claim 1, wherein step (a) comprises the steps of:
    applying a coating layer on the rotating surface of the rotator; and
    drawing the carbon nanotube film from the carbon nanotube array and adhering the carbon nanotube film on a surface of the coating layer.

13. The method of claim 12, wherein the coating layer includes a plurality of micropores distributed uniformly on the surface of the coating layer.

14. The method of claim 13, wherein a diameter of the plurality of micropores is in a range from about 1 micrometer to about 1000 micrometers.

15. The method of claim 13, wherein a distance between adjacent micropores is in a range from about 1 micrometer to about 1000 micrometers.

16. The method of claim 13, wherein a depth of the plurality of micropores is in a range from about 1 micrometer to about 1000 micrometers.

17. The method of claim 13, wherein a ratio of a diameter of the plurality of micropores and a distance between adjacent micropores is greater than or equal to 5:1, and the distance between adjacent micropores is less than or equal to about 100 micrometers.

18. The method of claim 1, further comprising treating the rotating surface of the rotator with an organic solvent to reduce a force between the carbon nanotube film and the rotator.

* * * * *